United States Patent [19]
Krutza

[11] Patent Number: 5,189,866
[45] Date of Patent: Mar. 2, 1993

[54] ELEMENT PROTECTION COVER APPLICATOR FOR ROUND HAY BALES

[76] Inventor: Lloyd J. Krutza, 9692 Cty. K, Amherst, Wis. 54406

[21] Appl. No.: 681,721

[22] Filed: Apr. 8, 1991

[51] Int. Cl.⁵ .................................................. B05B 11/04
[52] U.S. Cl. .......................................... 53/587; 53/211
[58] Field of Search ............... 53/118, 587, 211, 556, 53/588, 399

[56] References Cited

U.S. PATENT DOCUMENTS

| | | | |
|---|---|---|---|
| 3,863,425 | 2/1975 | Edwards | 53/211 |
| 4,077,179 | 3/1978 | Lancaster | 53/556 X |
| 4,248,031 | 2/1981 | Del Pozo, Jr. | 53/556 |
| 4,362,001 | 12/1982 | Cockerham, Jr. | 53/556 X |
| 4,827,700 | 5/1989 | Rampe | 53/587 |
| 4,891,930 | 1/1990 | Schaefer | 53/587 |
| 4,926,617 | 5/1990 | Van Mill | 53/587 |

FOREIGN PATENT DOCUMENTS 2705101 8/1978 Fed. Rep. of Germany ........ 53/211

Primary Examiner—John Sipos

[57] ABSTRACT

A mechanical agricultural device mounted on the rear three-point lift of an agricultural tractor, and receiving operational power from the same. Unit was devised to assist in the preservation of large hay bales, used as livestock feed the world over. After baling, wrapping is an on field operation that involves the penetration of center of bale with main center spear of the bale wrap machine. Bale and machine are raised at a height to prevent interference with ground area when rotated. An electrical remote control activates a series of mechanisms, hydraulic and electrical, that results in bale being wrapped in weather proof film of plastic. The wrap cycle, which starts after a remote start switch is activated, is completed without any manual assistance. Bales are protected and are then ready to be stored in an outdoor environment until it is ready to be consumed.

1 Claim, 11 Drawing Sheets

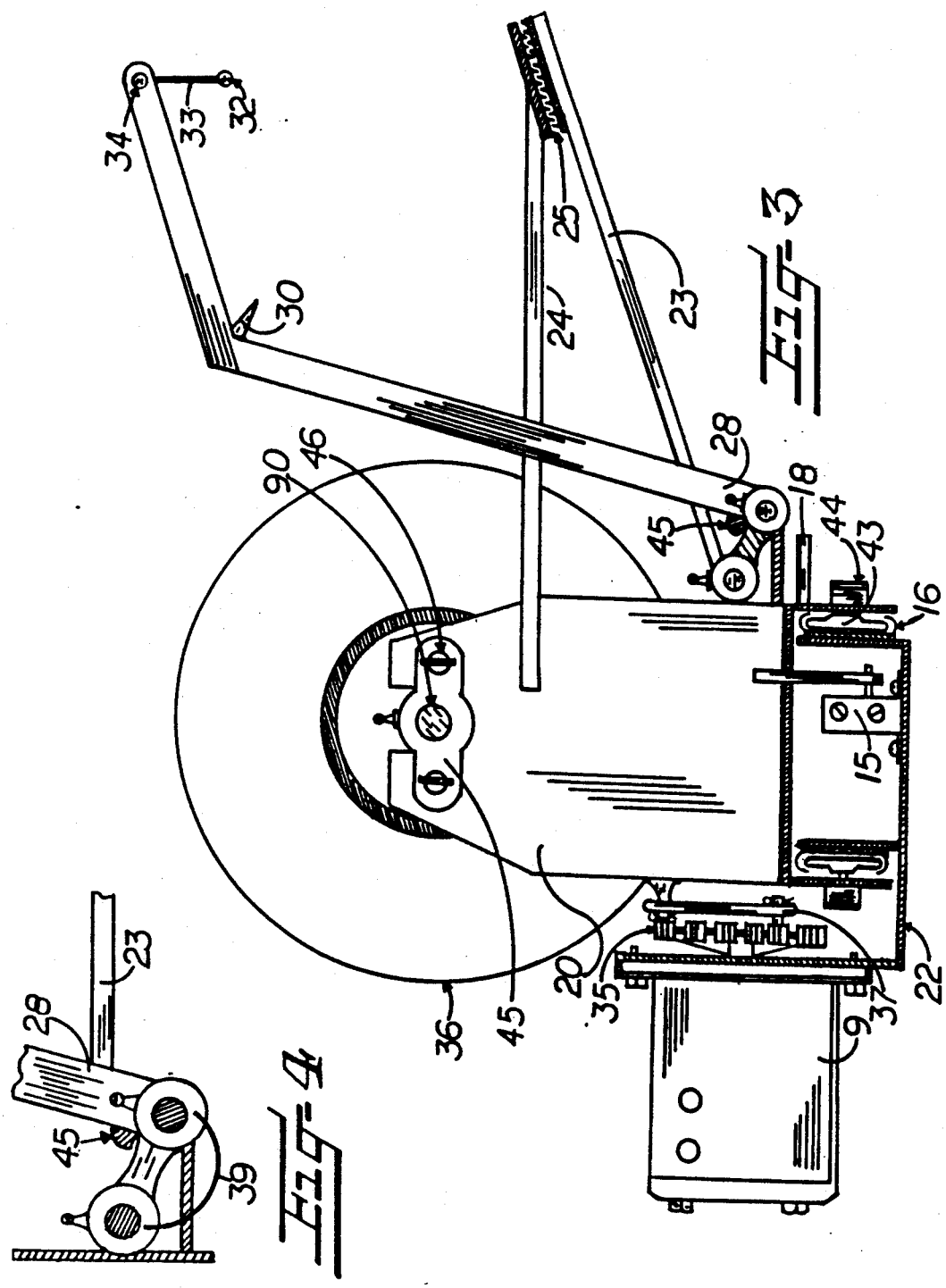

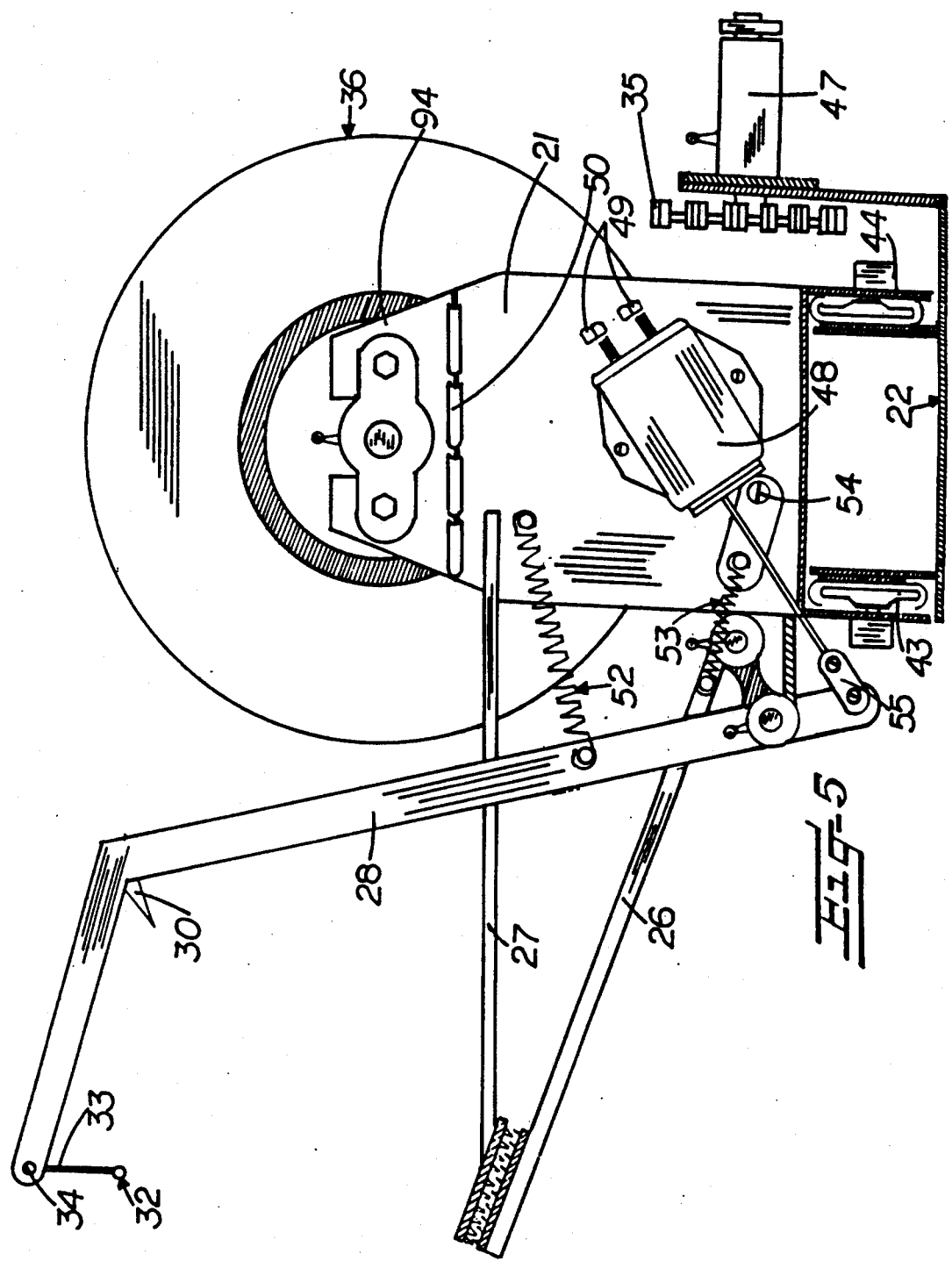

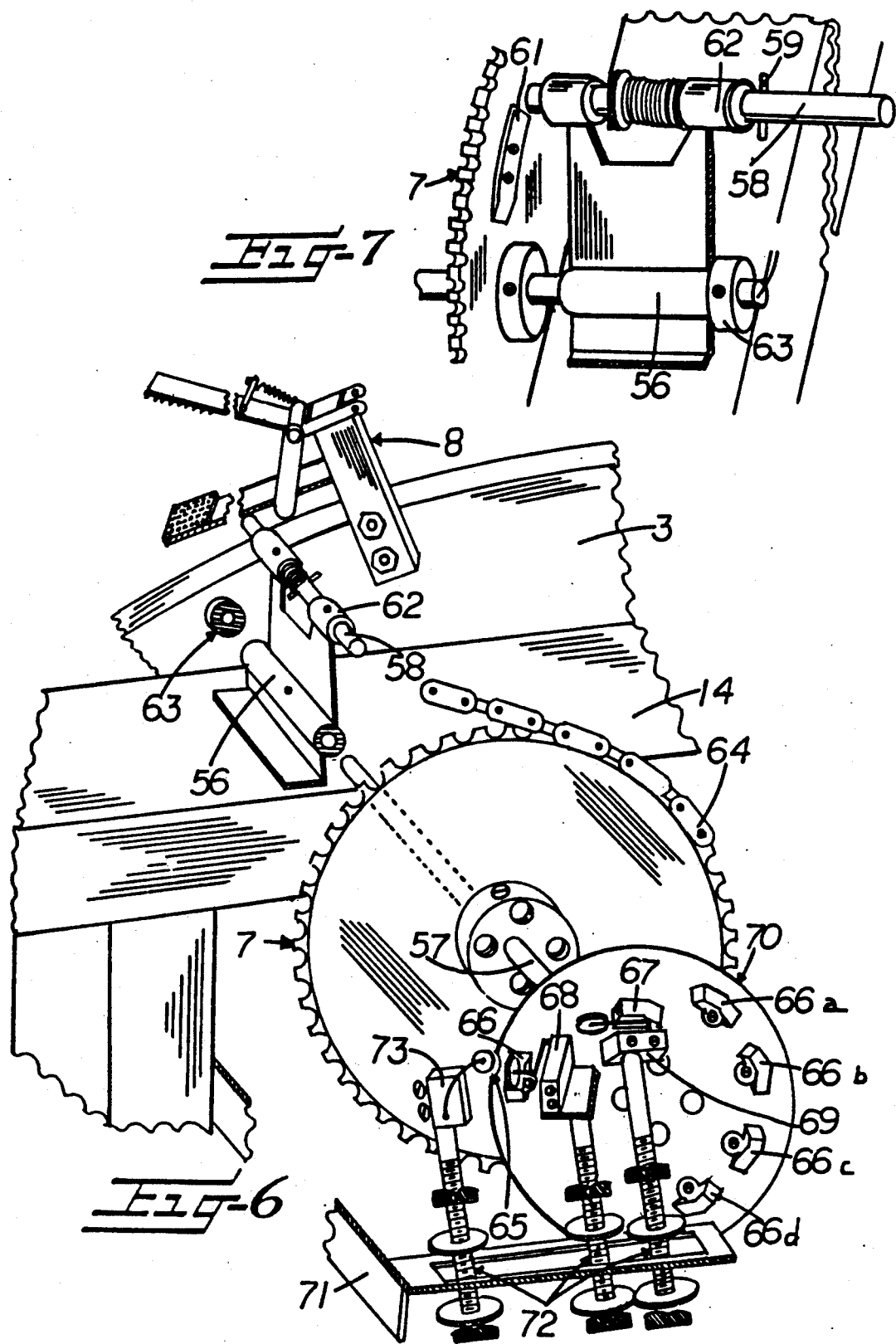

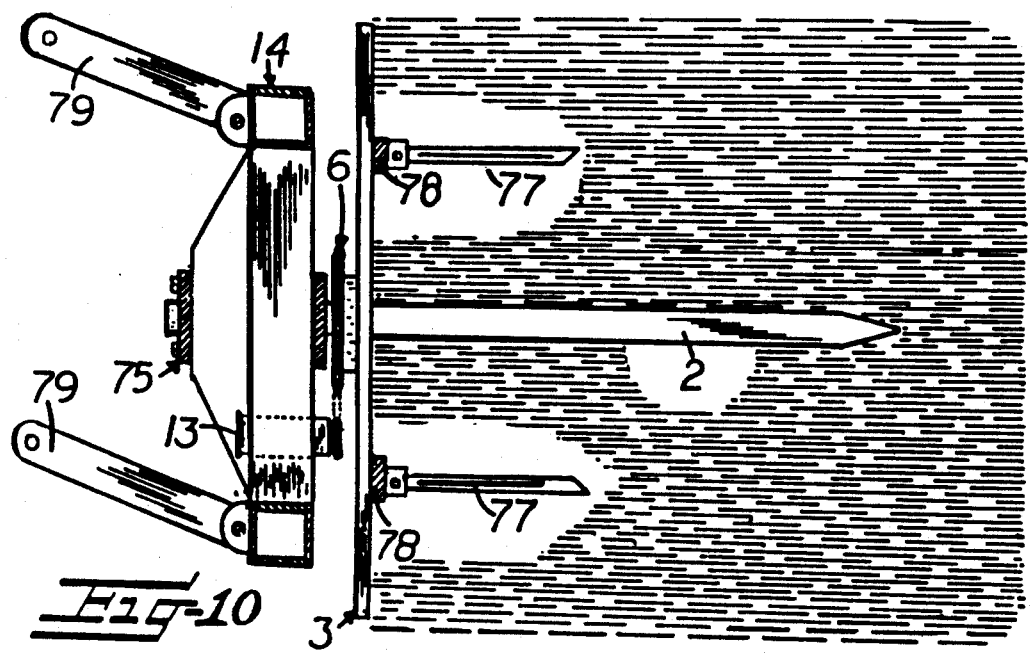
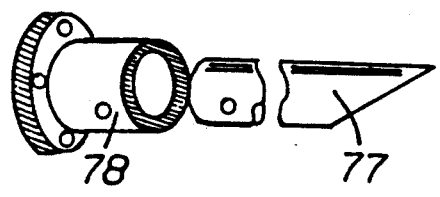
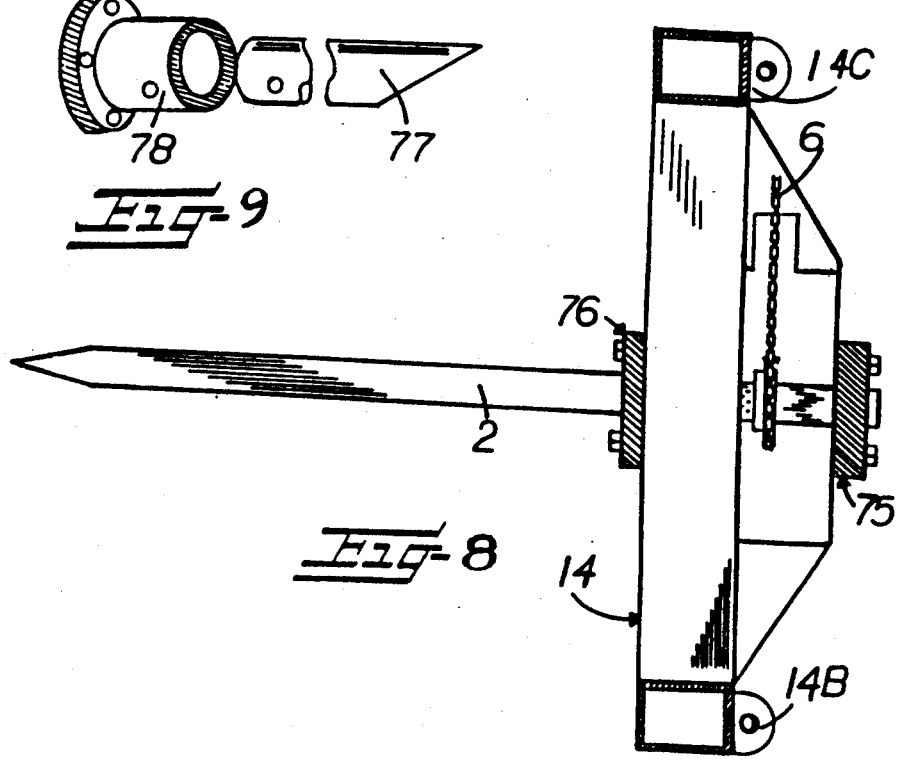

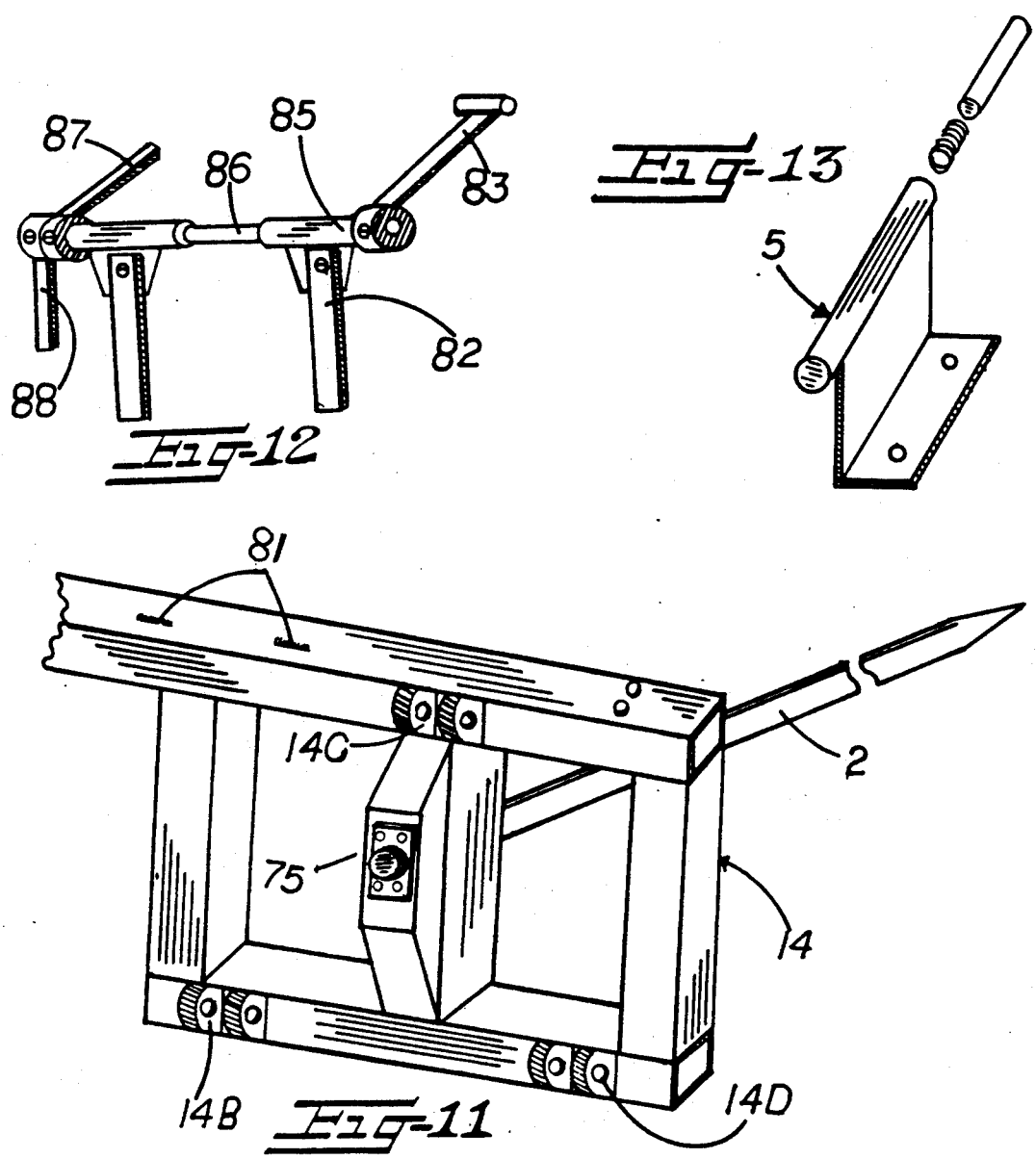

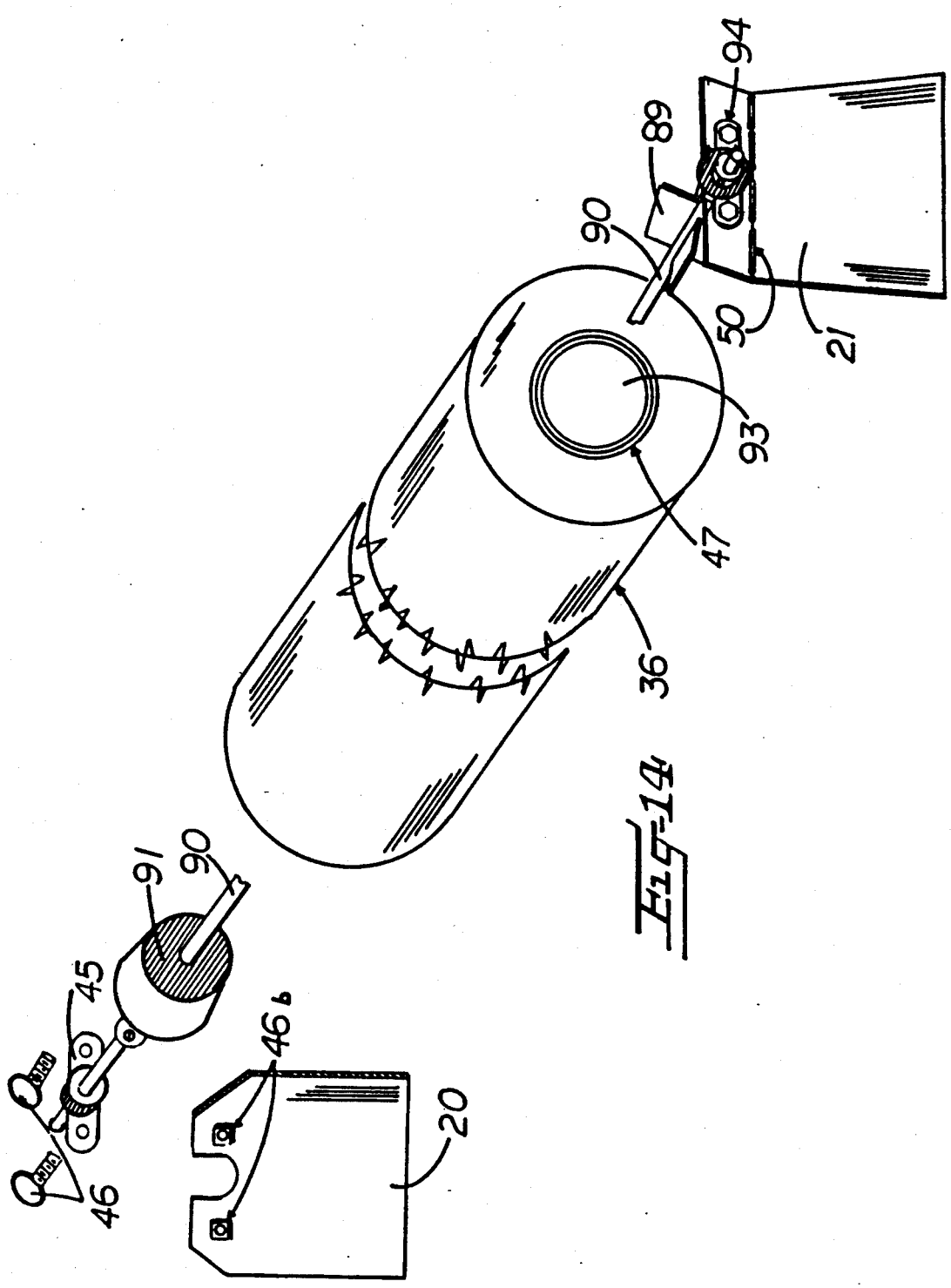

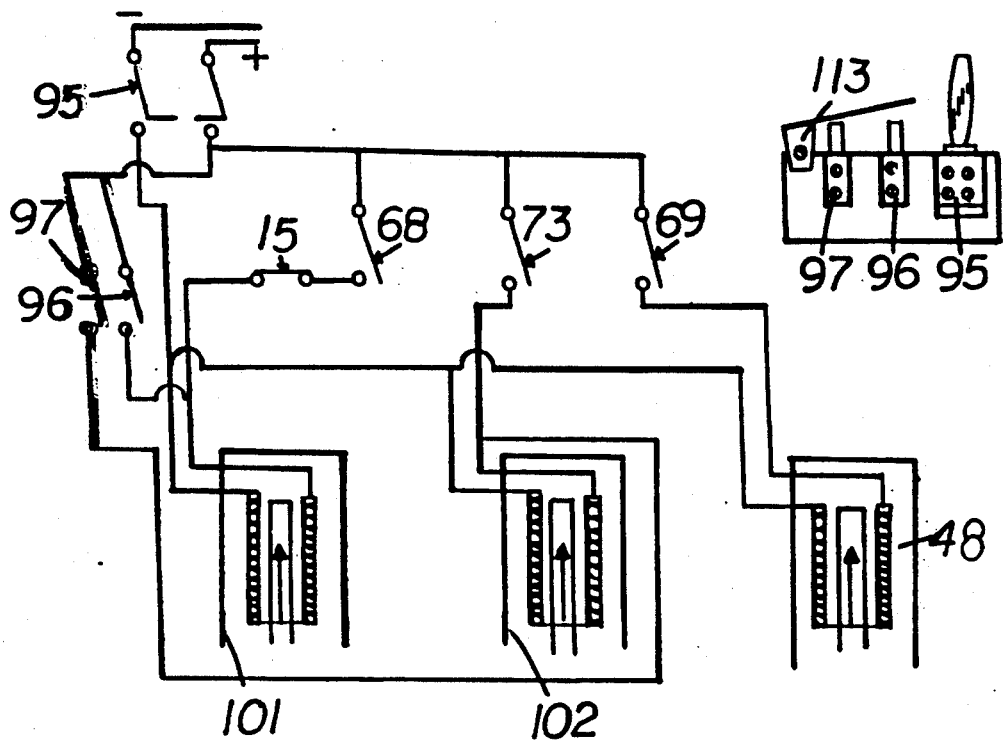
Fig-15
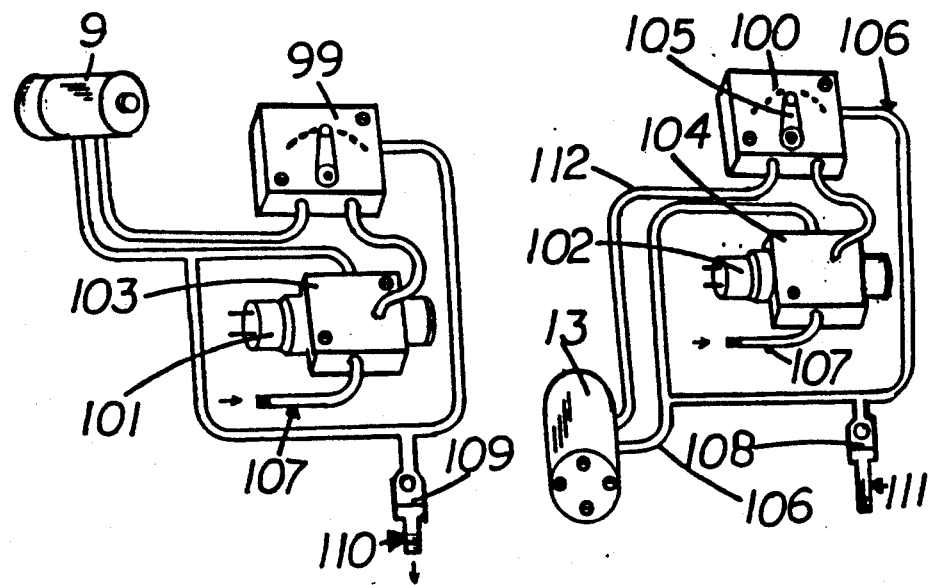

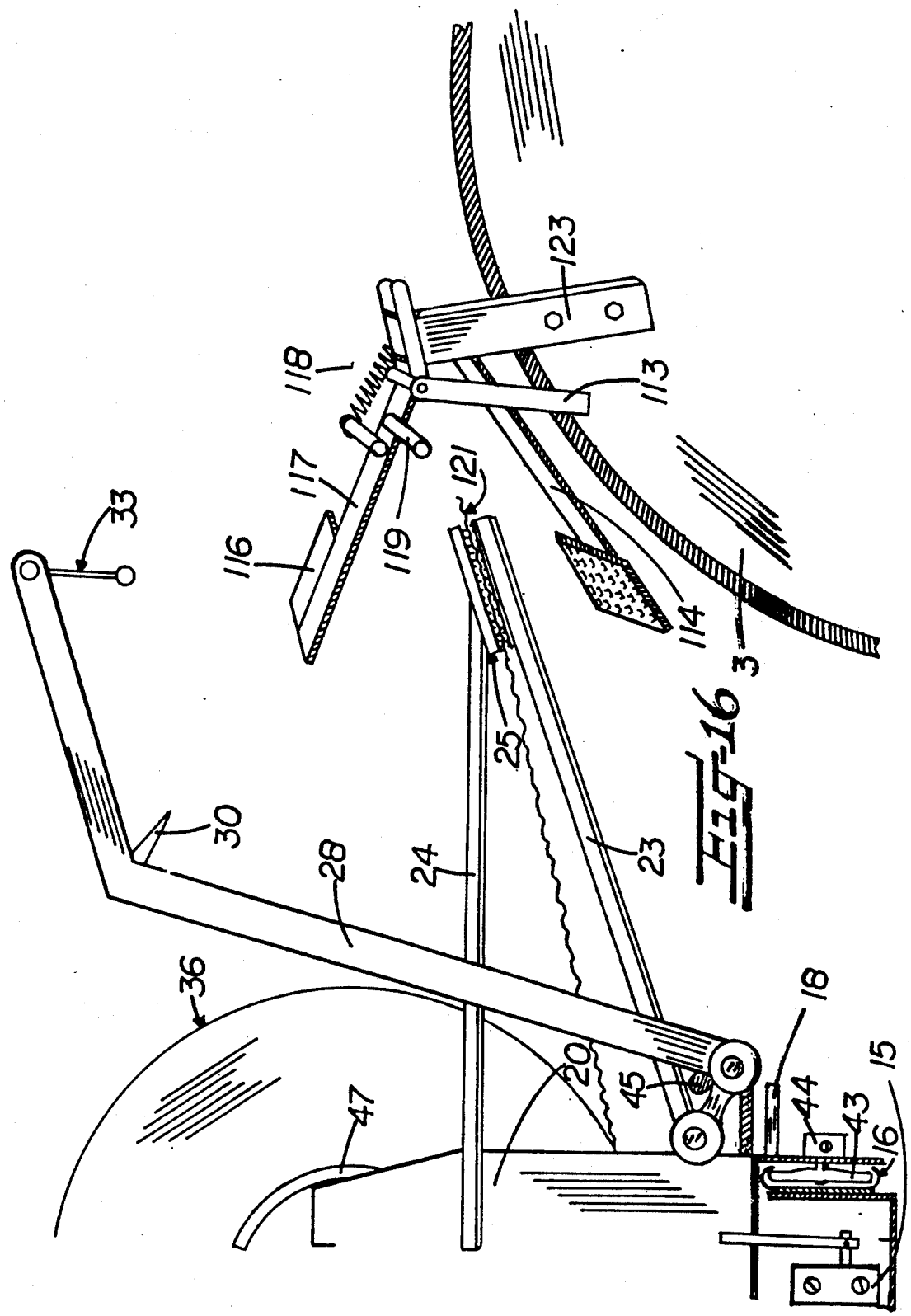

ELEMENT PROTECTION COVER APPLICATOR FOR ROUND HAY BALES

BACKGROUND OF THE INVENTION

1. Field of the Invention

This invention in general relates to agricultural harvesting. More particularly to installing a plastic cover over large individual bales of dry hay, in a time saving, automated fashion that will give excellent protection from the elements for an extended period of time.

2. Description of Related Art

In order to properly understand the background of large hay bales since their inception and their need for an efficient and practical covering to protect them from weather conditions when stored other than under a roof.

Large hay baling was introduced when a need was evident to harvest hay with less manpower in a more economical and efficient manner.

With this concept of harvest a new problem arose that had never been evident with other harvests, in which the hay was stored under cover.

Large bales were found to sustain a large degree of spoilage when stored outside and subject to the ravages of the elements. Thus arose the need for a protective covering that was not cost prohibitive to use and would fulfill the needs of protection, with speed and uniformity.

To further illustrate the need for covering, a midwest university's School of Agricultural has conducted spoilage and quality loss tests on bales that have been stored outside of a shelter. Results show that as much as twenty-five percent of the outer layer of hay will have spoiled to an extent that it has no feed value. Another eight to twelve percent under the outer layer will have a loss of color, develop an unpleasant odor and have a high drop in relative feed value, protein content, and palatability. (These are part of standard tests to determine quality for hay sales.)

Understanding the need to eliminate this loss brought about the quest for a positive solution.

I, the inventor of this machine, have done experimental hay covering work with large hay bales on my own farm for over ten years. For the last eight and one half years I have been using a spear type turning device mounted on the rear lift of a farm tractor. This process requires a two person operation, as the bale must be penetrated and raised to turn position. Rolled plastic material must be hand secured to the bale twine wrap. Bale is then turned with tractor power by manual control to advance the plastic cover to give overlap on each rotation and finally to manually cut the plastic film and return plastic roll to start position. Bale is then lowered and you proceed to the next bale.

Many farmers are very eager to wrap bales, however they hesitate to accept this concept because of labor and time consumed.

Thus, the development of this invention that uniformly wraps bales with the push of an electrical switch by the operator of the tractor without leaving his or her control position. This greatly exceeds the performance of any previous machines that have been made, as safety, ease of operation, cost, uniformity and speed are the results of a large degree of automation.

SUMMARY OF THE INVENTION

The principal objective of this invention is to present a machine that will serve a definite need on world farms and ranches to protect, with speed and ease, the bales that are now subject to rot, mildew and discoloration due to subjection to the elements. To better fulfill the needs of a protective cover applicator it must be stated that covering must be installed as soon after baling as possible to insure protection from dew forming on uncovered bales overnight and possibly of rain. Covering should be at a rate close to rate that the baler produces the bales. With one person baling and one person wrapping, covering will be accomplished soon after baling.

On average farms and ranches with previous wrap systems two persons are required or a very slow, tedious one man operation. The average hay producer will not have the capability and manpower to get immediate wrap on bales before they are subject to weather deterioration.

This invention operates with only operator penetration of the bale and lifting is electrically controlled and hydraulically powered with a timing mechanism which takes control at the time the wrap start switch is activated. Plastic roll material is held in start or load position.

Automatic operation of wrap starts at this point and proceeds to wrap bale. First one and one fourth rotation of bale is straight circular wrap. The one fourth straight wrapped secures the start end of plastic under the second wrap to insure unwrapping cannot occur when bales are moved. Second and third rotation are spiral wrapped with sufficient lap to seal. Fourth rotation is straight wrap with wrap cut off at the half way point of this rotation. Bale continues to rotate one half turn so cut off seam is on bottom side. This seam is thus protected from wind and offers complete seal as bale is sitting on edge when bale is stored. Carriage of machine then returns to start and loaded position where it stops to complete the cycle. This complete operation takes place unassisted after start switch is activated. Bale may then be lowered to ground surface and procedure made to next bale.

BRIEF DESCRIPTION OF THE DRAWINGS

FIG. 3 Shows a front elevation view of carriage assembly. FIG. 4 is an enlarged fragmentary front perspective of a cam activating device on FIG. 3.

FIG. 5 Shows a rear elevation view of carriage.

FIG. 6 Shows an enlarged fragmentary with parts broken away of parts related to timing mechanism.

FIG. 7 displays an enlarged fragmentary perspective of the reverse side of chain sprocket and mounting shown on FIG. 6

FIG. 10 Is a side elevation showing frame, mount, with an outline of simulated bale in place. FIG. 9 is an enlarged perspective broken away view of stabilizer spear mount as shown in FIG. 10. FIG. 8 is a left side elevation view showing position of drive sprocket and chain that drives timing assembly FIG. 6.

FIG. 11 is a front to rear perspective of main frame assembly to show mount positions of FIGS. 12 and 13. FIG. 12 is an enlarged perspective of reset linkage and mount position on main frame to clarify its position. FIG. 13 is an enlarged, exploded view of detent assembly with mounting detail on main frame.

FIG. 14 is an enlarged fragmentary perspective showing relationship of roll of plastic material to its mount on carriage assembly dispenser.

FIG. 15 Shows a schematic of complete electrical system. No other views of wiring are shown on subsequent drawings. FIG. 15 Perspective of complete hydraulic system with relationship to electrical system.

FIG. 16 is a side view elevation to show relative positions of two components during one phase of bale wrap cycle.

DETAILED DESCRIPTION

Figure 1:
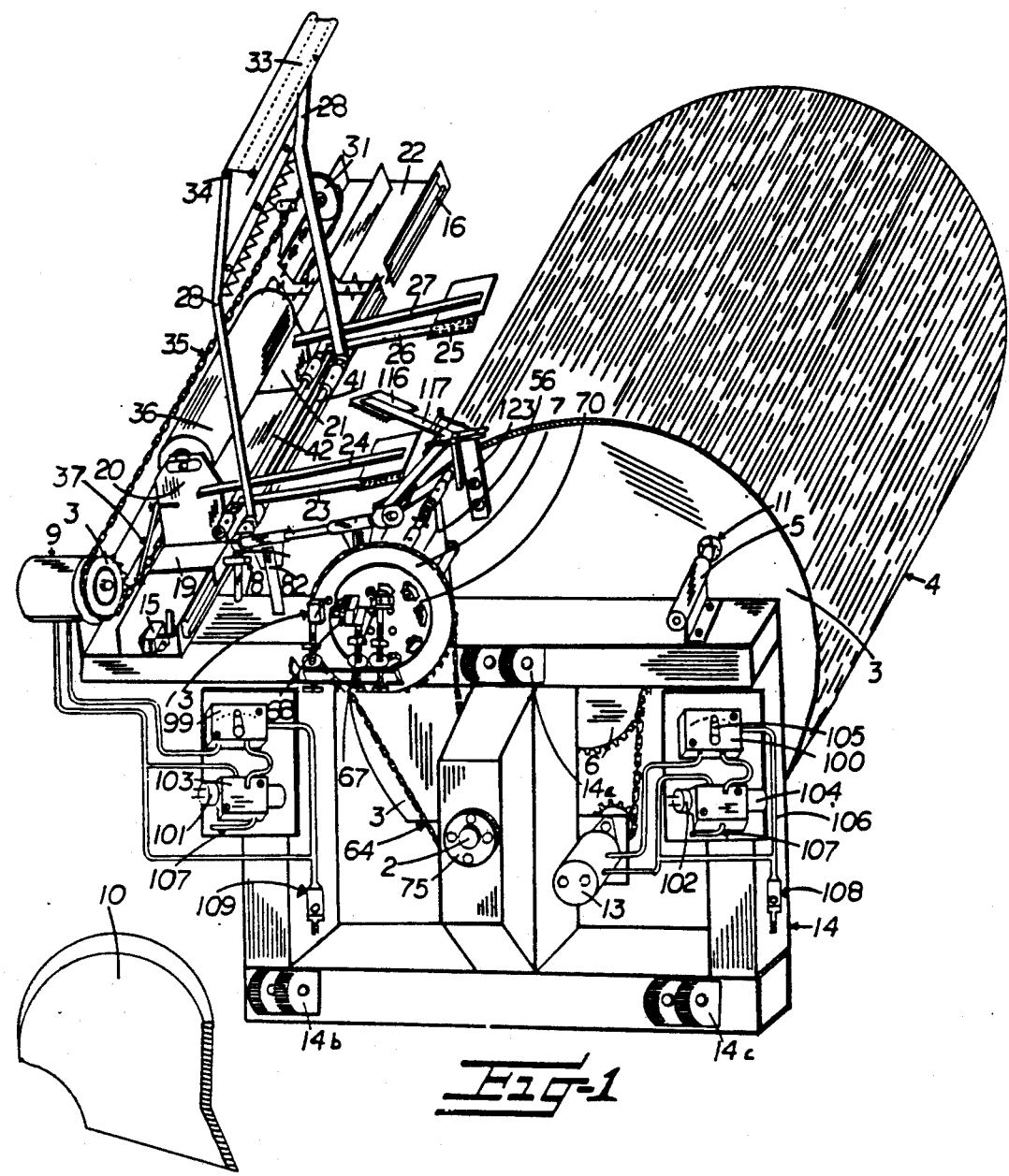
FIG. 1 Shows a front perspective of complete machine with simulation of a hay bale in wrap position Ref. #4. Numbers are used for reference in component breakdown views on subsequent sheets. A non-operational part, a safety shield Ref. #10 is shown on FIG. 1.

In the detailed and operative description of this invention procedure will: first, include all components with their relationship to each other; second, present a detailed operational description with specific information on each phase of the operation from start to completion. FIG. 1 of drawings is a total view of the invention. Reference numbers on this perspective give reference to section views included on 11 pages of drawings, which will be referred to as description proceeds. All separate components shown on one or more pages will have the same reference number.

Main frame with mounting brackets to tractor is referred to as FIG. 1 Ref. #14. Frame is of rectangular steel tubing, six by four inches with one fourth inch thickness, to support weight required. Frame unit members are secured at all open seams with weldment that results in a one piece fabricated unit.

Figure 17:
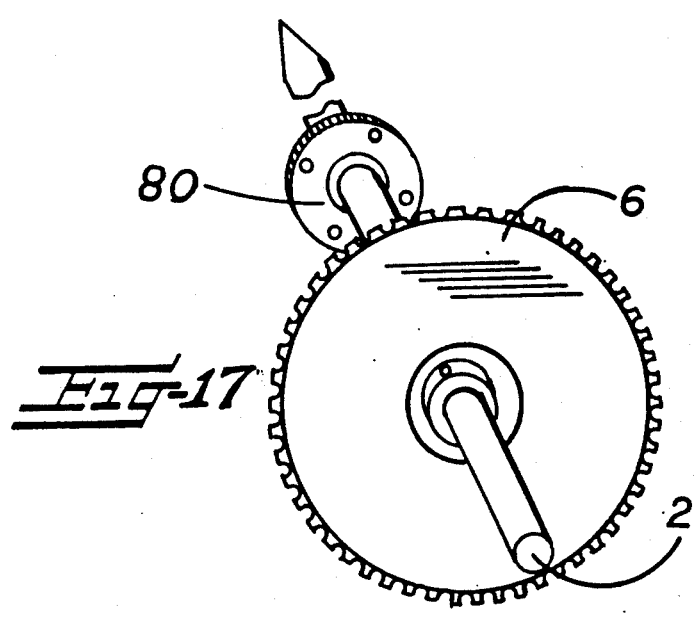
FIG. 17 is a front to rear perspective, broken away to show attachment of shaft driven gear and circular bale backing disc to main spear shaft.

FIG. 1 Ref. #3 is shown as partial circular disc mounted on FIG. 17 Ref. #80 hub and FIG. 17 Ref. #2 spear shaft.

Figure 18:
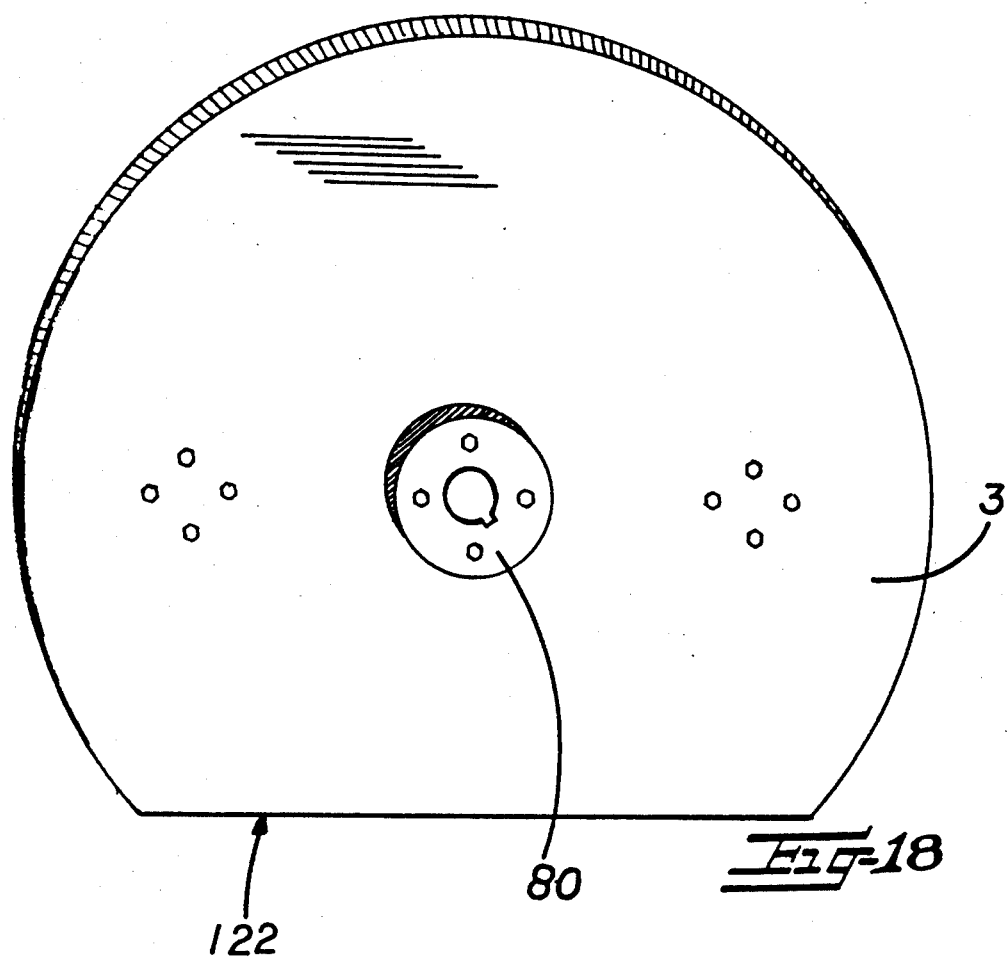
FIG. 18 is a front perspective view of circular bale backing disc to show irregular shape at bottom, not shown clearly in other views.

FIG. 18 Ref. #3 shows configuration of disc with bottom area cut away to diminish distance from center to lower edge, this being required to bring spear down in horizontal position close enough to surface of the soil that the minimum diameter bale may be impaled in center area by spear, FIG. 10 Ref. #2 which has an exposed length of fifty four inches. FIG. 17 Ref. #2 shows disc to shaft mounting hub Ref. #80, with fasteners securing disc, hub, and shaft into one unit.

FIG. 17 views mount of spear to driven sprocket Ref #6. FIG. 1 Ref. #11 views indentation in bale backing plate disc Ref. #3 and detent assembly Ref. #5, which engages when disc Ref. #3 is in start/stop lock position.

FIG. 13 Ref. #5 is a separated component view with detent, plunger, spring and fabricated mount shown in related mounting position to FIG. 1 Ref. #14 main frame. FIG Ref #8 gives perspective of bale start clamping jaws. FIG. 16 is an enlarged component view of FIG. 1 Ref. #8 bale start clamping jaws. Ref. #123 is mount mast that secures unit to bale backing disc Ref. #3. FIG. 16 Ref. #114 is stationary arm with weldment to Ref. #123 mast. Ref. #115 and Ref. #116 are rubber, bonded to steel pad to form gripping area to hold plastic wrap between Ref. #114 lower stationary arm, and Ref. #117, upper movable arm, when in closed position to start wrap cycle. Ref. #118 spring, controls over center movement to hold in either open or closed position.

Ref. #119 extended arm, is used to close jaws at a set timing point. Ref. #120, pivot point for upper arm, also serves as stop to limit upper travel of arm Ref. #117. Ref. #113 FIG. 16 is jaw opening arm.

FIG. 1 Ref. #7 refers to FIG. 6 and FIG. 7 for enlarged fragmentary front to rear perspective. FIG. 6 Ref. #56 views fabricated dual bearing assembly with weldment to main frame FIG. 1 Ref. #14. Lower bearing supports main timing assembly shaft, Ref. #57 with shaft locking collar, Ref. #63 holding shaft in position. Main driven timing sprocket Ref. #7, is locked to timing shaft, Ref. #57. Timing chain, Ref. #64 is driven from drive sprocket mounted on main spear shaft, FIG. 8 Ref. #2. Timing ratio between drive sprocket, FIG. 8 Ref. #74, and driven sprocket, FIG. 6 Ref. #7 is at four revolutions on drive shaft to one revolution on driven shaft. This arrangement allows four circular wraps on the maximum length bale.

FIG. 6 Ref. #70 represents a clear high density plastic timing wheel upon which are mounted six plastic cams. Five are adjustable to change wrap cycle from a standard five foot long bale to a shorter four foot length.

FIG. 6 Ref. #66 cam is located in cycle start/stop position. Cams Ref. #66-66A-66B-66C and 66D are located circular with a predetermined radius from center of wheel. Cam Ref. #67 is located on the radius of a smaller circle for alignment with Ref. #69 switch, which controls plastic cut-off solenoid displayed on FIG. 5 Ref. #48.

Timing switch Ref. #68 controls wrap carriage motor. Timing switch Ref. #73 represents on and off cycle of bale rotating spear, shaft and disc. FIG. 6 Ref. #65 is stop detent in Ref. #70. All switches located on FIG. 6 illustrations are normal off switches. Ref. #70 wheel is secured to hub of sprocket with four fasteners.

Bracket, Ref. #71 is secured to main frame FIG. 1 Ref. #14 with a weldment and serves as adjustment base for switch mounting stems FIG. 6 Ref. #72 that have fore and aft, up and down adjustment for proper timing switch alignment to timing wheel, FIG. 6 Ref #70.

FIG. 7 shows an enlarged fragmentary perspective of the reverse side of driven sprocket, Ref. #7 to show position of cam Ref. #61 that activates spring loaded shaft Ref. #58 after seven-eights of the fourth bale rotation to contact arm, FIG. 16 Ref. #113 thus opening bale start clamping jaws.

FIG. 7 shaft Ref. #58, pins Ref. #59 and spring Ref. #60 are parts of an assembly using the upper bearing assembly FIG. 7 Ref. #62 of fabricated unit Ref. #56.

Figure 2:
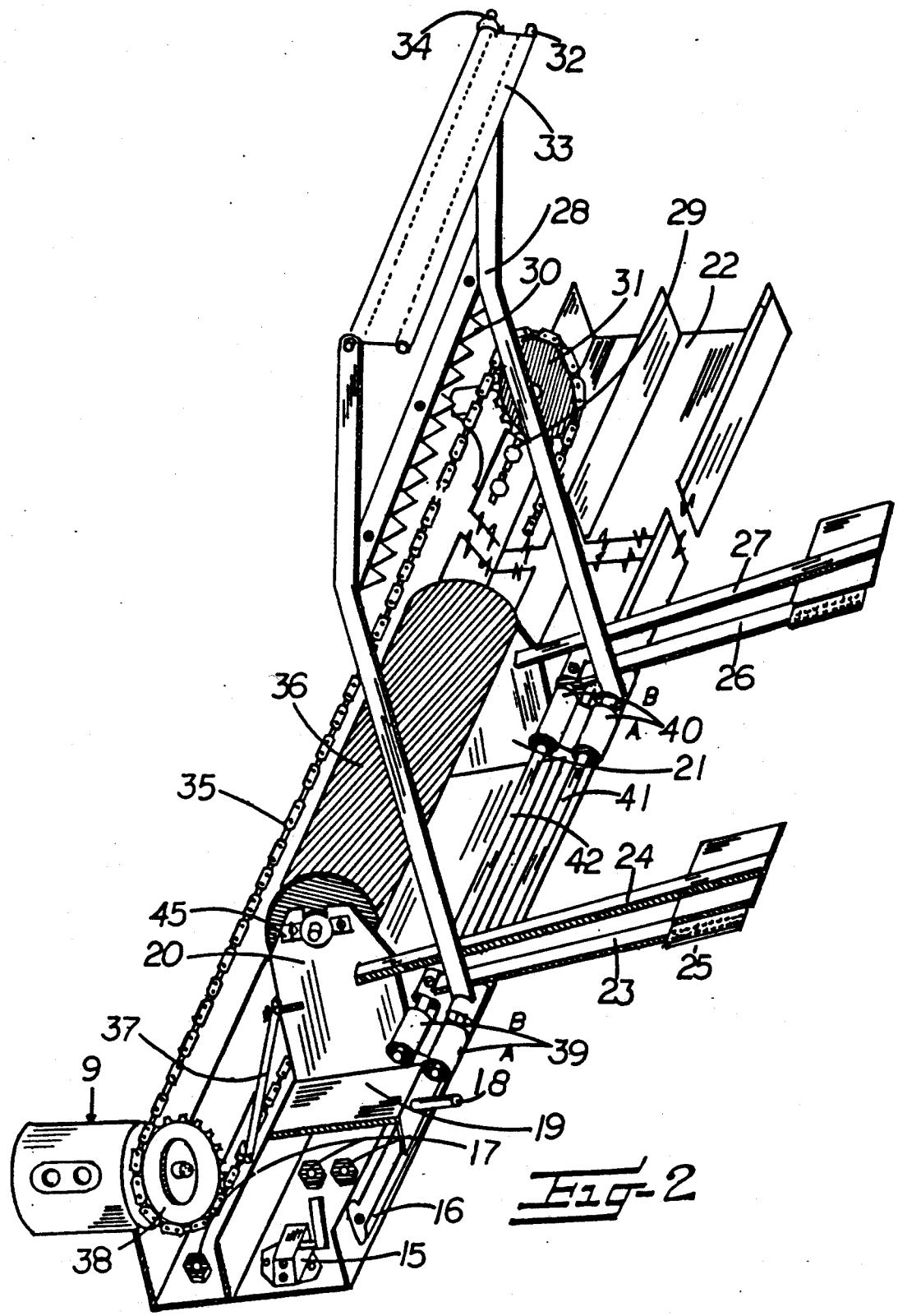
FIG. 2 Is a front to rear perspective of wrapping carriage assembly.

FIG. 2 pertains to complete carriage assembly.

FIG. 2 Ref. #19 travels, dispenses, holds and cuts the plastic during the wrap cycle. Main frame of carriage consists of one steel U channel and one L angle secured with weldment to form a LU configuration. Shown in Ref. #22 on each side of U channel is mounted a C track, Ref. #16 the full length of frame. This track is the runway for carriage wheels, not shown on this perspective, but shown on FIG. 3 Ref. #43. FIG. 2 Ref. #19 represents the traveling carriage. Ref. #20 and Ref. #21 are upright ends with weldment to base. Ref. #24–27 upper plastic film grip arms are secured to ends Ref. #20–#21 with weldment.

Four bushing type bearings Ref. #39–#40 are secured to ends Ref. #20 and #21. Shaft, Ref. #41, extends through lower bearing, Ref. #39A and #40A and is free to rotate. Cutoff arms Ref. #28 have weldment to bushing that is pinned secure to shaft Ref. #41. Shaft Ref. #42 rotates freely in upper bearings. Ref. #39B-40B Lower plastic film grip arms have weldment to bushing that is pinned securely to shaft, Ref. #42. Rubber bonded to steel gripper pads, Ref. #25 are secured by weldment to ends of gripper arms Ref. #23-24-26-27.

Ref. #30 views removable, sharpenable cutoff blade mounted between Ref. #28 cut off arms. At outer end of cut-off arms, Ref. #28 a plastic smoothing flap, Ref. #33 is mounted around free moving pin, Ref. #34 and weighted down on free edge of flap with steel rod, Ref. #32.

Hydraulic orbiting motor, Ref. #9 is mounted on front end of LU channel, Ref. #22.

Chain roller sprocket Ref. #38 is secured on hydraulic motor shaft. Roller chain, Ref. #35, connects Ref. #38 sprocket with idler roller chain sprocket, Ref. #31, at rear of frame, Ref. #29. Chain adjustment is made with movement of idler assembly, FIG. 5 Ref. #47. Connecting rod, Ref. #37, connects to attachment link on roller chain, Ref. #35 to mount on front carriage end plate, Ref. #20. This arrangement allows carriage travel from front to rear and back to front with hydraulic motor travelling in one direction. Ref. #17 fasteners secure carriage assembly frame, Ref. #22, to main frame, FIG. 1 Ref. #14. FIG. 2 Ref. #15 as shown represents an arm type travel limit switch, normally in on position, mounted on Ref. #22. Ref. #18 indicates an extension pin to activate reset linkage, FIG. 12.

FIG. 14 shows outer surface of plastic wrap roll as Ref. #36. Ref. #47 shows width of hard paper core inward to Ref. #93 hollow core. Dimensions for commercial plastic available for this use are uniform as shown with total length of twenty inches.

Rear mount, Ref. #21, is hinged, Ref. #50, to allow front end of shaft, Ref. #90 to be raised to insert new roll of plastic without removing Ref. #94 bearing assembly. To install roll remove wing fasteners Ref. #46A through bearing Ref. #45 and slide bearing assembly off shaft Ref. #90. Loosen screw, Ref. #92, from cone assembly Ref. #91 and slip cone assembly off of end of shaft, Ref. #90. Slide bale wrap roll, Ref. #36, on shaft to make contact with taper fins, Ref. #89 and slide on for snug fit. Replace cone Ref. #91 into inner opening of roll, placing it as far as it will go into center cavity. Replace retaining wing fastener in cone, Ref. #92 and secure to shaft Ref. #90. Replace bearing assembly Ref. #45 on shaft. Place back in groove in upright mount Ref. #20 and secure with wing fasteners, Ref. #46A into cage nut assembly, Ref. #46B.

FIG. 3 represents a front end elevation of moving carriage assembly Ref. #19 with its relative connection to main frame channel, Ref. #22. Carriage wheel assembly, Ref. #43 consists of steel roller wheel rotating around stationary shaft on ball bearings. Shaft is attached to retainer sleeve, Ref. #44, that is secured to carriage frame Ref. #19 with a weldment. One such assembly is located on each corner of carriage frame Ref. #19. Two roller wheels on either side travel in C track, FIG. 2 Ref. #16 giving a smooth and true travel pattern through wrapping cycle. All other references on FIG. 3 have been identified in previous drawings.

FIG. 4 is an enlarged fragmentary elevation of cut-off arm, Ref. #28 and lower plastic film grip arm, Ref. #23 in their relationship to cam Ref. #45. In this diagram lower gripper arm is in a lowered position that it maintains at time bale is being wrapped. At proper point when plastic is to be cut, timing mechanism will activate cut-off arm solenoid FIG. 5 Ref. #48. As cut-off arms are pulled down, cam, FIG. 3 Ref. #45 will engage lower edge of gripper arm Ref. #23 causing it to rise and make contact with stationary gripper arm FIG. 3 Ref. #24, thus retaining the cut-off edge of plastic in rubber retaining jaws.

FIG. 5 is a rear enlarged elevation perspective showing location of cut off solenoid, Ref. #48 and solenoid adjustment clevis, Ref. #55. Ref. #52 views cut-off arm return spring. Spring will return cut-off arm to upright position after solenoid, Ref. #48 has been activated and cut off assembly pulled down to make cut. Solenoid Ref. #48 pulls only in inward direction being free at time power is disconnected. Ref. #53 shows over center spring adjustment to equalize spring tension on either side of pivot point. In such position gripper arms, Ref. #23 and #24 FIG. 3 will stay in either open or closed position with an equal amount of tension. They will move only when assistance is given to draw spring, FIG. 5 Ref. #53 over center of pivot point.

All other reference numbers on FIG. 5 have been identified in previous drawings.

FIG. 10 is a side elevation view of frame Ref. #14, spear Ref. #2, disc Ref. #3, two stabilizing shafts Ref. #77 and simulated bale Ref. #4, to show outline and comparative dimensions.

FIG. 8 Ref. #76-#75 views position mounting of bearings that support spear shaft Ref. #2. Arms shown in Ref. #17 are not a part of bale unit. They would be lift arms on tractor and are shown only to get a perspective of their function.

FIG. 9 is an enlarged detailed view of mount bracket, Ref. #78, that secures stabilizer spear Ref. #77, to disc Ref. #3.

FIG. 8 is a side elevated view of main frame from opposite side as FIG. 10, shown only to show opening in frame for timing drive chain, Ref. #64 to have running clearance.

FIG. 16 is an enlarged fragmentary elevation view of relationship of parts at one point of carriage return. Plastic cover is being held between gripper arms, Ref. #23 and #24, as carriage proceeds toward end of cycle. Bale start clamp jaws, Ref. #8, are now in open position to allow gripper arms to pass through. Ref. #8 clamp is now in position to be closed and grasp plastic for load and start position of another bailing cycle.

FIG. 15 represents a schematic of electrical system for control of hydraulic system. Power for system is supplied from twelve volt tractor supply. Ref. #95 is shown as master power on-off switch on FIG. 15. Positive line proceeds to switches Ref. #68, #73, and #69, also shown on FIG. 6. Positive line also feeds to switches FIG. 15 Ref. #97 and #96 also shown as Ref. #97 and #96 as a remote start cycle by-pass switch. Ref. #68 timing switch controls solenoid on three way hydraulic control valve that operates carriage. Solenoid is shown as FIG. 15 Ref. #101. Ref. #15 is a normally on, travel limit switch as shown on FIG. 3 to stop carriage at end of cycle. Timing switch FIG. 15 Ref. #73 activates solenoid Ref. #102 on FIG. 6 that controls turning of bale. Timing switch Ref. #69 activates solenoid FIG. 5 Ref. #48 to operate cover cut-off linkage.

FIG. 15 shows identical hydraulic control and power units, exception being relative location of hydraulic motors. Each system works from independent valve on tractor with two line connection to each assembly. Hydraulic pressure enters control valve Ref. #107 to a solenoid activated, spring return, three-way hydraulic valve. When activated, pressure goes to Ref. #100 constant pressure speed control, with flow adjustment from zero to full speed at motor. Ref. #112 is pressure line to motor as arrows indicate. Ref. #106 is return flow of excess from speed control valve, Ref #100 Ref #106 includes return flow from hydraulic motor, Ref. #9 when in operation and Ref. #104 hydraulic control valve when in neutral or unactivated position. All return flows are returned to Ref. #108 a one way check valve to prohibit back reverse flow, that could damage system, in case of improper hook up. Flow then returns to tractor hydraulic system through Ref. #111.

Operation procedure for this invention will be presented as follows step by step.

FIG. 1 main frame Ref. #14 is connected to two lower left arms on tractor, with mounts Ref. #14B and #14C on main frame and top adjustable link connecting to Ref. #14D. Adjustable link must be adjusted in length either to shorten or to lengthen to bring to a horizontal position spear, FIG. 10 Ref. #2. This will insure that machine maintains a horizontal plane at bale penetration position.

Using a hydraulic connection system consisting of two pairs of hoses, one pressure and one return on each pair, a pressure line is attached to each of pressure inlets FIG. 15 Ref. #107 and a return line is attached to each of fittings FIG. 15 Ref. #111.

Remote switch module FIG. 15 Ref. #113 is attached to tractor in position convenient to operator. Power, electrical and hydraulic, and hydraulic lift action are now available to machine.

Raise wrap machine hydraulic lift arms to check spear FIG. 10 Ref. #2 for horizontal alignment. Final adjustment can be made at this point.

Detent assembly FIG. 1 Ref. #5 will now be located in Ref. #11 detent indentation on disc, FIG. 1 Ref. #3. At this position stabilizer spears FIG. 10 Ref. #77 will also be in a horizontal plane in relationship to the surface of the earth.

Procedure at this point would be to approach bale, raise or lower frame FIG. 1 Ref. #14 so spear, FIG. 10 Ref. #2, is in alignment with center of bale. Then penetrate bale with spear as to bring edge of bale against disc FIG. 10 Ref. #3. Wrap cycle is now about to start. Timing switches FIG. 6 Ref. #73 and #69 are in off position. Switch Ref. #73 had reached the stop indentation Ref. #65 on timing wheel Ref. #70 to bring it into off position. Ref. #69 switch has passed cam Ref. #67 and also is in off position. Switch Ref. #68 is in an on position as it was at that position on cam Ref. #66 when limit switch, Page 2—FIG. 2 Ref. #15 was opened by travel of carriage assembly FIG. 2 Ref. #19. As a result of this action all motion had stopped on the previous cycle.

Plastic cover is now being held in bale start clamping jaws, FIG. 16 Ref. #8, with new cycle about to begin. With the absence of power to any of the switches, a method was devised to start a new cycle. FIG. 15 Ref. #113 is the remote control switch. Switches, FIG. 15 Ref. #96 and #97 are as such wired to bypass all other switches to start machine. On same FIG. 15 will be noted switch Ref. #97 is about to be engaged by angled lever. This design allows, when lever is depressed, that switch Ref. #97 will engage shortly before switch Ref. #96. This allows bale turn motor to turn before carriage assembly, FIG. 2 Ref. #19 starts its travel. Switches Ref. #97 and #96 are engaged momentarily as timing wheel starts to move. Switch roller arm FIG. 6 Ref. #73 has moved out of its indentation in timing wheel, FIG. 6 Ref. #65. As carriage, FIG. 2 Ref. #19 starts to move, limit switch, FIG. 2 Ref. #15 returns to normal on position and machine is then on automatic wrap.

As bale turns, timing switch, FIG. 6 Ref. #68, is still on cam Ref. #66, allowing carriage to move a short distance. As switch then drops off cam Ref. #66 switch is opened and carriage movement stops. Switch FIG. 6 Ref. #73 is now in on position and will remain in this position for four rotations of bale or one rotation of timing wheel. Bale continues to turn until it reaches one and one-fourth turns. The one fourth turn is to allow plastic on second revolution to overlap the starting end of plastic, thus tightly securing it.

At one and one-fourth revolutions cam, Ref. #66, will have reached a position at switch Ref. #68 activating it to on position. Carriage assembly, FIG. 2 Ref #19, will travel toward rear of bale, creating a spiral pattern wrap with a three to four inch overlap. As each of following cams, FIG. 6 Ref. #66B–#66C and #66A activate switch, carriage continues to wrap in a spiral pattern. As switch FIG. 6 Ref. #68 proceeds over last cam, switch will go to off position and carriage, FIG. 2 Ref. #19, will stop and last revolution of bale will be straight as was the first. After three fourths of the fourth revolution switch Ref. #69 will engage on cam Ref. #67 activating cut-off solenoid, FIG. 5 Ref. #48 bringing cut-off knife, FIG. 2 Ref. #30, into cut position.

As cut-off arms proceed down to cut plastic, cam, FIG. 3 Ref. #45 will engage bottom edge of gripper arm, FIG. 3 Ref. #23, causing an upward closing movement which expands spring, FIG. 5 Ref. #52 to pass over center position, closing the jaws, FIG. 16 Ref. #25 and plastic is then held in this position. As cut-off knife, FIG. 16 Ref. #30, cuts plastic, Ref. #33, plastic flap will make contact with cut plastic on bale, smoothing it down on underlying wrap.

Cam, FIG. 6 Ref. #67, is of predesigned length to keep switch Ref. #69 active until cut edge of plastic is at bottom of bale. At this point cut-off arm starts to retract, and cam, FIG. 7 Ref. #61 moves the spring retained shaft, FIG. 7 Ref. #58 toward bale start clamping jaws, engaging the position arm, FIG. 16 Ref. #113. On contact, upper clamp arm, FIG. 16 Ref. #117 will open, and stay open as the action of over center spring, FIG. 16 Ref. #118 holds bale start clamp jaw, FIG. 16 Ref. #8, in open position.

Timing switch, FIG. 6 Ref. #73, will now drop in notch, FIG. 6 Ref. #65 on timing wheel, FIG. 6 Ref. #70. It will open circuit and bale rotation will stop.

Carriage assembly, FIG. 3 Ref. #19 will continue to travel toward stop position. FIG. 16 gives perspective of position of Ref. #8, bale start clamp jaws, in relationship to gripper arms Ref. #23 and rubber clamp jaws Ref. #25 in which the plastic Ref. #121 is being held as the carriage FIG. 3 Ref. #19 returns. Carriage return is possible as the result of timing switch, FIG. 6 Ref. #68 being in closed position and cam wheel FIG. 6 Ref. #70 being stationary.

Observing this situation, limit switch, FIG. 3 Ref. #15 is the only control to stop carriage in proper stop-start position. As carriage continues its travel, plastic held between rubber pads, FIG. 16 Ref. #25, will continue through open jaws of bale start clamp Ref. #8, locating plastic in position for bale start clamp Ref. #8 to grip when closing occurs. At this point of travel FIG. 12 a reset linkage and FIG. 3 Ref. #15 limit stop switch, will become active.

FIG. 12 Ref. #88 will contact pin, FIG. 16 Ref. #18 causing a forward movement of arm FIG. 12 Ref. #88. Arm, FIG. 12 Ref. #87 will penetrate the opening between gripper arms, FIG. 16 Ref. #23 and #24 as FIG. 12 Ref. #88 travels forward. Ref. #87 arm will travel down, contacting gripper arm, FIG. 16 Ref. #23 and reset arm FIG. 12 Ref. #84 wi)1 travel down at same time, contacting FIG. 16 Ref. #119 pin. Further travel by Ref. #87 arm and Ref. #83 arm will cause gripper arm, FIG. 16 Ref. #23 to snap open to release plastic and bale start clamp jaws Ref. #8, to clamp shut and to grip plastic. Limit switch, FIG. 3 Ref. #15, is now open and wrap cycle is complete.

Lower bale to ground and drive forward, with machine ready and waiting for next bale.

Average bale made by modern balers is approximately five feet in diameter and five feet wide. Other sizes are as small as four feet in diameter and three feet wide. Four and five foot wide bales can be wrapped on this machine with only placement adjustment of cams. To wrap four foot wide bales, cam FIG. 6 Ref. #67 would be moved to engage switch, FIG. 6 Ref. #69 after only three rotations and activate cut-off mechanism. Cam FIG. 6 Ref. #66A would be removed. Thus, cut off would occur and carriage would proceed to end of rearward travel and return to front stop position in normal fashion.

Cam placement on wheel, FIG. 6 Ref. #70 can be made to control overlap and width of bale wrap. Adjustment of speed can be made only when bale is being wrapped. Speed of bale turn is approximately one revolution in twenty seconds. Speed of carriage motor should be synchronized to turn at approximately same speed as bale turn motor. Speed control is made by speed adjustment lever on FIG. 15 Ref. #105.

I claim:

1. A plastic film wrap cover applicator machine for round hay bales with an automatic wrap cycle, defined as the period of time after electrical activation is made until wrap is finished with no manual assistance required, said machine comprising a frame, means for mounting said frame on rear hydraulic lift arms of an agricultural tractor which supplies the lift remote hydraulic and electrical power to attached machine, which make the wrapper operational to perform a wrap cycle of automatic wrap operation after bale has been lifted to wrap position by tractor lift linkage with wrap machine components being mechanically and hydraulically activated by an electric remote switch mounted on tractor, disk means rotatably mounted on said frame, means on said disk means for axially penetrating and supporting said bale, bale start clamp jaws mounted on said disk means, means for opening and closing said clamp jaws for holding the leading end of said film, a plastic timing wheel for controlling the wrapping cycle of said machine, hydraulic motor for rotating said disk means and said timing wheel controlled by a hydraulic control valve that is electrically controled, for turning at a ratio of one revolution to four of the bale, to give a maximum of four wraps of twenty inch wide plastic cover film to each cycle, a carriage assembly for supporting a roll of plastic film, hydraulic means for moving said carriage assembly parallel to the bale axis, a series of three electrical switches mounted in position to be activated by pre-determined position of a first set of cams on said timing wheel relative to step by step operation required to complete wrap cycle that will entail the timed movement of said hydraulic powered traveling mechanical carriage assembly that travels in proper-timed sequence to advance the plastic film wrap with control of application to bale as overlap on each of four wrap revolutions, the first which is of parallel to vertical end of bale, the second and third of spiral nature with overlap, and the fourth is again straight and parallel to vertical edge of bale, a cut-off blade mounted on a pivoting arm for cutting said film, electrical pull solenoid for pivoting said arm and cutting said film, a plastic smooth down flap freely mounted for swinging movement on said cut-off arm for smoothing the cut edge of said plastic film one half turn before bale turn stops and carriage returns to start-stop position, rubber faced carriage clamp jaws mounted on said carriage assembly for cooperating with said bale start clamp jaws, means for opening and closing said carriage clamp jaws for clamping raw cut edge of plastic film at time cut was made and carriage was in return position enabling film to be grasped by said bale start clamp jaws, thus completing wrap cycle and machine is in start-stop position and reset to accept and wrap next bale of common size, sixty inches diameter and sixty inches in length, a second set of cams for said timing wheel for controlling the wrapping of bales with a variation of diameters and additional lengths of thirty-six, forty-eight inches, making it compatible to most round bales produced with current balers.

* * * * *